Dec. 6, 1932.   B. F. GRAVELY   1,889,830
LAWN MOWER DEVICE
Filed Feb. 6, 1932   2 Sheets-Sheet 1
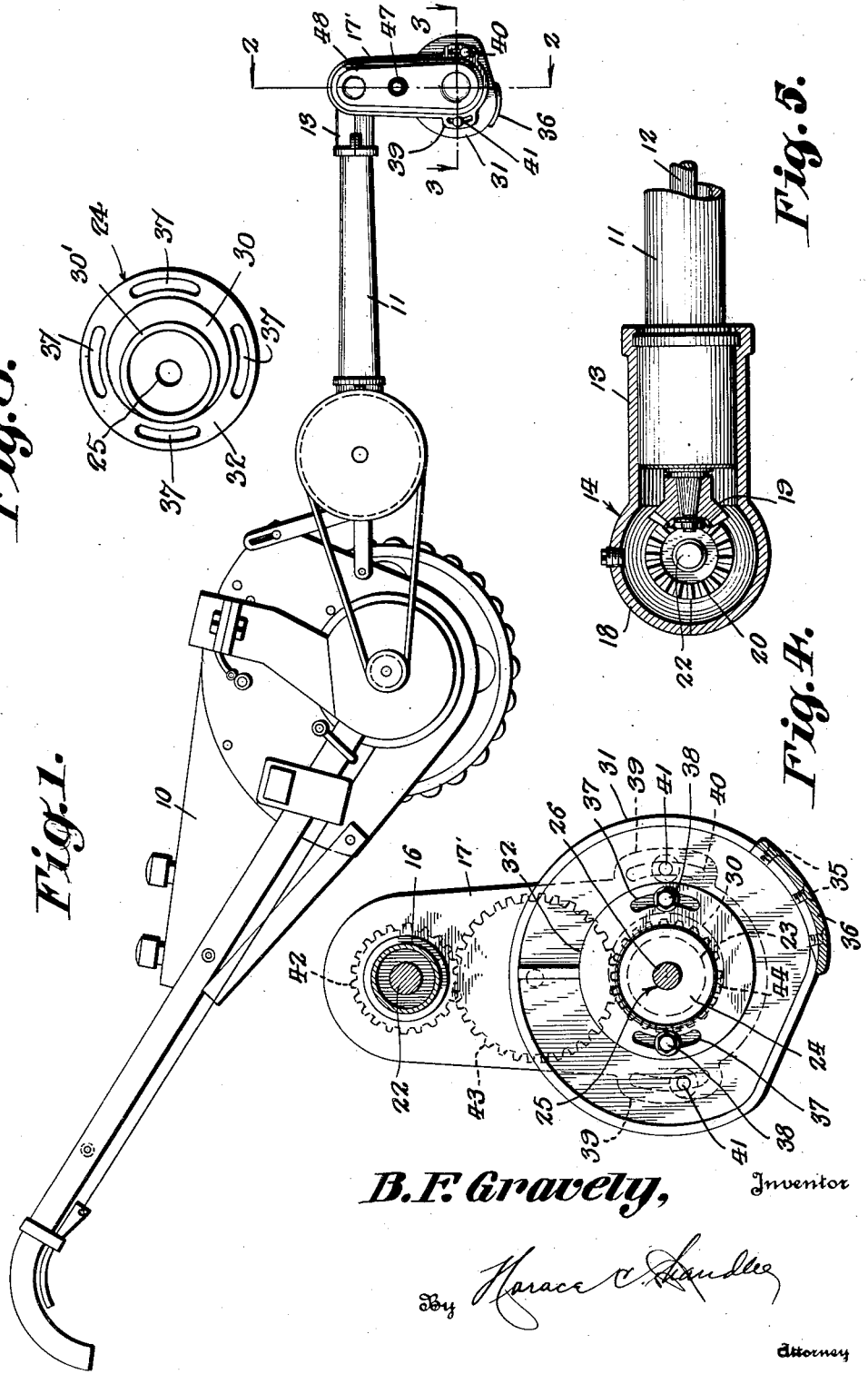

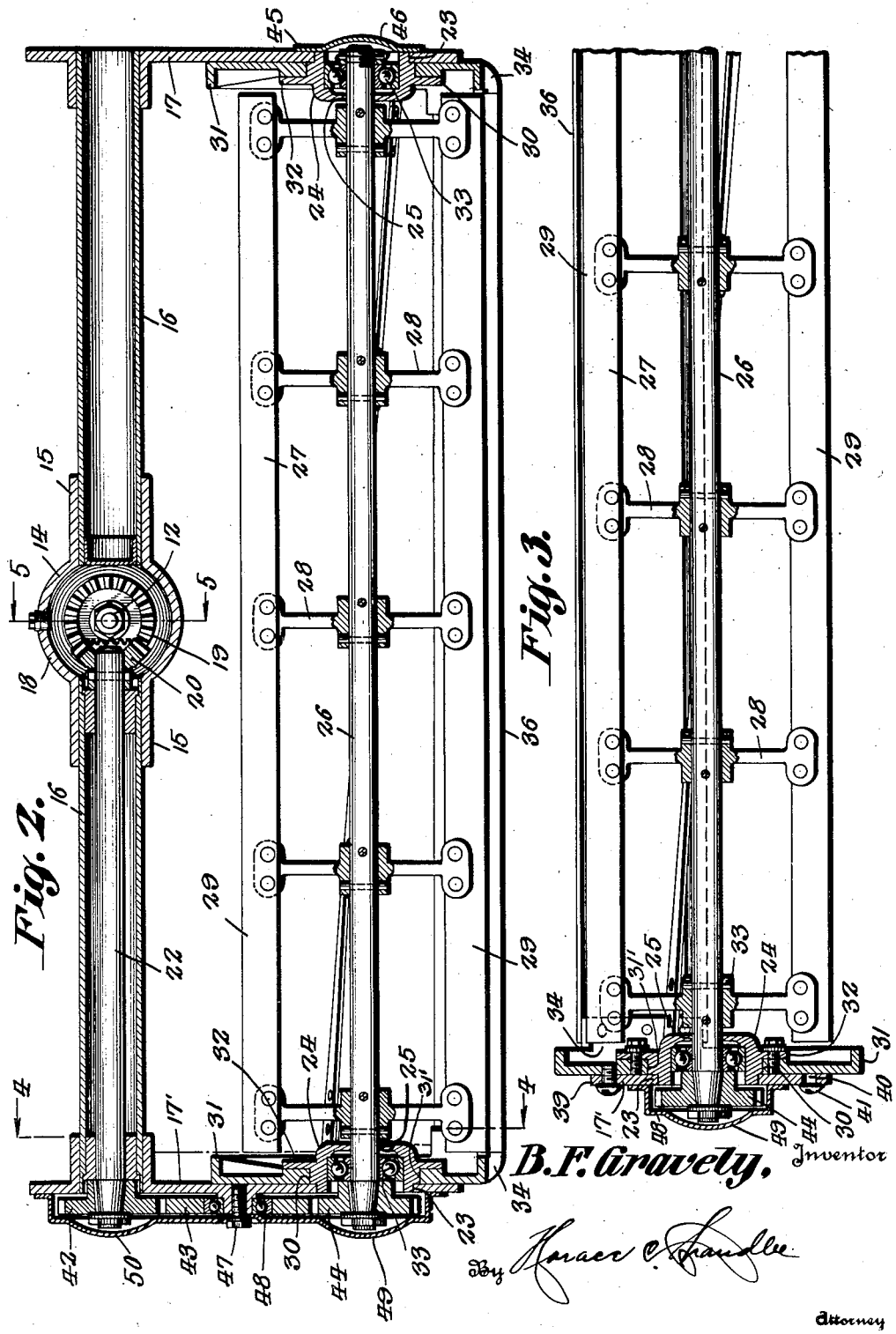

Patented Dec. 6, 1932

1,889,830

UNITED STATES PATENT OFFICE

BENJAMIN F. GRAVELY, OF DUNBAR, WEST VIRGINIA

LAWNMOWER DEVICE

Application filed February 6, 1932. Serial No. 591,418.

This invention relates to new and useful improvements in mowing devices, and particularly to a lawn-mowing attachment for use in connection with tractors, the same being especially adapted for use in connection with the tractor shown in my pending application, filed April 22, 1929, Ser. No. 357,140.

One object of the invention is to provide a lawn-mower device including novel means for adjusting the parts whereby to cause the device to cut the grass to greater or lesser degrees.

Another object is to provide a device of this character which includes novel means for adjusting the cutting reel toward and away from the stationary knife blade.

Other objects and advantages will be apparent from the following description when taken in connection with the accompanying drawings.

In the drawings:

Figure 1 is a side elevation of the invention applied to my tractor.

Figure 2 is a vertical sectional view on the line 2—2 of Figure 1, enlarged.

Figure 3 is a horizontal sectional view on the line 3—3 of Figure 1.

Figure 4 is a vertical sectional view on the line 4—4 of Figure 2.

Figure 5 is a vertical sectional view on the line 5—5 of Figure 2.

Figure 6 is a view of the flanged face of one of the members 24.

Referring particularly to the accompanying drawings 10 represents the tractor, with which the invention is adapted to be used, said tractor having a forwardly tapering tubular member 11 connected to the front thereof, and extending forwardly therefrom. In this member 11 is a longitudinally extending shaft 12, operated by the tractor, and adapted, at its front end to operate the mower, as will be explained later herein.

Secured on the forward end of the tubular member or casing 11, by means of the branch 13, is an approximately T-shaped casing 14, the same having two oppositely extending lateral branches 15, in which are received the inner ends of the tubular casing 16, said casings having their outer ends connected with the upper ends of the two end frames 17, 17', of the mowing device. The intermediate portion of the casing 14 is approximately spherical, as indicated at 18, within which is journaled the forward end of the drive shaft 12, said shaft end carrying a bevel gear 19. This gear 19 meshes with a similar gear 20, on the adjacent end of a shaft 22, rotatably supported in one of the casings 16. To distinguish the two end frames 17, one from the other, one of said frames is designated by the numeral 17'.

In the lower portion of each of the end frames 17 and 17' is a circular opening 23, which receives the reduced portion 30', of the circular flange 30, formed on the concave side of a concavo-convex member 24, said flange being eccentric with respect to the center of the member, as clearly seen in Figure 6. In the member 24, concentric with respect to the reduced portion 30', of the flange 30, is an opening 25, which receives an end of the shaft 26, said shaft forming the axis of the rotary cutting reel 27. This reel also includes the radial arms 28, on which are mounted the longitudinally extending knives 29. It will be noted that these members 24 are applied to the end frames from the inner sides thereof. A disk 31 is provided with an opening 31', in which is rotatably engaged the main body 30 of the flange. Each member 24 is also provided with a peripheral flange 32, which overlies the central portion of the disk 31, to hold the latter in frictional contact with the inner face of the side frame. Antifriction bearings 33 are mounted in each of the members 24, in surrounding relation to the end of the reel shaft, as clearly seen in the sectional views, Figures 2 and 3. Formed on the lower side of each of the end disks 31, is an inwardly directed, horizontal lug 34, and secured to these lugs, by the screws 35, and extending between said disks, in position to be engaged by the rotary knives 29, is the stationary knife 36, of the mower.

In diametrically opposite points in the flange 32 of each member 24 are formed the arcuate slots 37, the same being concentric with respect to the flange 30. Disposed through each of the slots, and engaged in the central portion of the disk 31, is a screw 38. Upon loosening the screws 38, and rotating the members 24, in the same direction, the disks 31 will be moved to adjust the stationary knife 36 toward and away from the reel knives, whereby to provide for the proper contact of the knives of the reel with the stationary knife.

Extending from diametrically opposite sides of the frames are the lugs 39, in each of which is formed an arcuate slot 40, a screw 41 being passed through each slot, and engaged in one of the end disks 31. Upon loosening these screws 41, after being sure that the members 24 are properly secured to the disks 31, and rotating the disks 31, the reel, together with the stationary knife, will be rotated, concentrically, with respect to the reel shaft, whereby to raise and lower the stationary knife, with respect to the ground, and thereby provide for cutting off more or less of the grass.

Mounted on the outer end of the shaft 22 is a pinion 42, which meshes with a similar pinion 43, supported on the outer face of the frame 17', therebelow, and said pinion 43 meshes with a pinion 44, which is mounted on the adjacent end of the reel shaft 26.

Removably attached to the outer face of the end frame 17 is a plate 45, having a concavo-convex portion 46, covering the opening 23 of the frame.

Removably attached to the outer face of the frame 17', by means of the screw 47, is an elongated plate 48, said plate having the concavo-convex portions 49 and 50, the former of which covers the opening 23, of the frame, while the latter covers the pinion 42.

Thus, by means of the members 24, the rotary knives may be properly adjusted toward and away from the stationary knife, and by means of the disks 31, the entire cutting mechanism may be adjusted toward and away from the ground, to adapt the mechanism for cutting the grass at different heights.

What is claimed is:

1. A lawnmower device comprising supporting end frames, a rotatable cutting reel, a stationary knife, means for supporting said reel, and means for supporting said supporting means in said frames, said first-named supporting means being adjustable within the second supporting means for moving the reel toward and away from the stationary knife.

2. A lawnmower device comprising supporting end frames, a rotatable cutting reel including a central shaft, means on the frames supporting the ends of said shaft eccentrically therein, a stationary blade for engagement by said reel, and means supporting said stationary blade and supported on the reel supporting means for adjusting said blade with relation to the ground.

3. A lawnmower device comprising supporting end frames, rotatable means supported on said frames, a stationary cutting knife carried by said rotatable means, a rotatable cutting reel including a central shaft, and rotatable members supporting the ends of said shaft concentrically supported by said stationary knife supporting means and eccentrically engaged with said end frames, means for locking the knife supporting means with relation to said frames, and means for locking the shaft supporting means with relation to the knife supporting means.

4. A lawnmower device comprising supporting end frames having openings, members eccentrically rotatable in said openings, a rotatable reel having a central shaft the ends of which are eccentrically supported in said rotatable members, a stationary knife for engagement by said reel, and rotatable means concentrically mounted on said rotatable members and carrying said stationary knife for adjusting said knife with relation to the surface of the ground.

5. A lawnmower device comprising supporting end frames each having an opening, a member rotatable in each of said openings having an eccentrically arranged opening, a reel having a central shaft the ends of which are supported in the openings of said members, disks eccentrically rotatable on said rotatable members, and a stationary knife supported on said disks for engagement by said reel.

6. A lawnmower device comprising supporting end frames having openings, members rotatable within said openings and having eccentrically arranged openings, a cutting reel including a shaft having the ends thereof rotatable in said member openings, disks eccentrically rotatable on the rotatable members, means for locking the disks on the end frames, and means for locking said rotatable members on said disks.

7. A lawnmower device comprising supporting end frames, a rotatable cutting reel supported on the frames, a stationary knife supported on the frames, a hollow means connecting said frames, a hollow member connected to said first hollow means and adapted for attachment to a tractor, a shaft in the first hollow means having driving connection with the cutting reel, and a driving shaft in the second hollow member having driving connections with the first-named shaft and adapted to be driven by the tractor.

In testimony whereof, I affix my signature.

BENJAMIN F. GRAVELY.